(12) United States Patent
Arad (10) Patent No.: US 7,920,564 B1
(45) Date of Patent: Apr. 5, 2011

(54) DIFFERENTIAL SERVICES SUPPORT FOR CONTROL TRAFFIC FROM PRIVILEGED NODES IN IP NETWORKS

(75) Inventor: Nir Arad, Nesher (IL)

(73) Assignee: Marvell Israel (M.I.S.L.) Ltd. (IL)

( * ) Notice: Subject to any disclaimer, the term of this patent is extended or adjusted under 35 U.S.C. 154(b) by 776 days.

(21) Appl. No.: 11/475,323

(22) Filed: Jun. 26, 2006

(51) Int. Cl.
*H04L 12/56* (2006.01)
*H04L 12/28* (2006.01)

(52) U.S. Cl. ......... 370/392; 370/235; 370/385; 370/400

(58) Field of Classification Search .................. 370/235, 370/392, 385.21, 400
See application file for complete search history.

(56) References Cited

U.S. PATENT DOCUMENTS

| | | | | |
|---|---|---|---|---|
| 6,292,489 B1 * | 9/2001 | Fukushima et al. | ......... | 370/401 |
| 6,304,578 B1 * | 10/2001 | Fluss | ......... | 370/413 |
| 6,768,738 B1 * | 7/2004 | Yazaki et al. | ......... | 370/392 |
| 6,996,062 B1 * | 2/2006 | Freed et al. | ......... | 370/235 |
| 7,408,935 B2 * | 8/2008 | Yazaki et al. | ......... | 370/392 |
| 7,769,873 B1 * | 8/2010 | Mackie | ......... | 709/229 |
| 2002/0027924 A1 * | 3/2002 | Fukushima et al. | ......... | 370/401 |
| 2003/0003938 A1 * | 1/2003 | O'Neill et al. | ......... | 455/519 |
| 2004/0146044 A1 * | 7/2004 | Herkerdorf et al. | ......... | 370/351 |
| 2004/0190527 A1 * | 9/2004 | Okura et al. | ......... | 370/395.21 |
| 2005/0089054 A1 * | 4/2005 | Ciancaglini et al. | ......... | 370/412 |
| 2006/0034297 A1 * | 2/2006 | O'Neill | ......... | 370/395.53 |
| 2007/0002740 A1 * | 1/2007 | Evans et al. | ......... | 370/230.1 |

* cited by examiner

*Primary Examiner* — Pankaj Kumar
*Assistant Examiner* — Lonnie Sweet (57) ABSTRACT

A network device receives a packet at a network interface and determines whether the packet represents control traffic. The network device also determines whether the packet is received from a privileged node. To achieve this, a source address is extracted from the packet, a query of the source address is performed in an address database, and a node status attribute associated with the source address is returned from the address database. If the packet represents control traffic and is received from a privileged node, the network device may modify one or more attributes of associated with the packet. These attributes may include a traffic class, drop precedence, or bandwidth restriction. Packets that represent control traffic may be placed in a priority queue for further processing based upon their modified attributes.

49 Claims, 6 Drawing Sheets

FIG. 6

DIFFERENTIAL SERVICES SUPPORT FOR CONTROL TRAFFIC FROM PRIVILEGED NODES IN IP NETWORKS

BACKGROUND OF THE INVENTION

The present invention relates in general to packet processing on data networks and, more specifically, to providing improved security and control over quality of service.

Network packet processors may be store-and-forward devices that perform one or more processing operations upon packets traveling over a network. Packet processing may include functions such as routing packets, implementing network security, and maintaining availability of service.

Maintaining availability of service on a network device may require packet processors to handle different types of traffic generated by different categories of users. Packet processors may process some data packets differently to obtain a desired result such as reducing latency or maintaining throughput.

BRIEF SUMMARY OF THE INVENTION

In accordance with an exemplary embodiment of the present invention, a method of processing data packets in a network is disclosed. The method comprises receiving a packet at a network interface, determining whether the packet represents control traffic, and determining whether the packet is received from a privileged node. If the packet is determined as representing control traffic and as received from a privileged node, one or more attributes associated with the packet are modified. The packet is then processed according to the one or more modified attributes.

Additional embodiments of the present invention determine whether the packet represents control traffic based upon at least one of a network protocol, address field, destination port, or application type associated with the packet. In exemplary embodiments, determining whether the packet is received from a privileged node includes extracting a source address from the packet, performing a query of the source address in an address database, and retrieving a node status attribute associated with the source address from the address database. In further embodiments, the address database is a forwarding database.

In a specific embodiment of the present invention, the one or more attributes modified include at least one of a traffic class, drop precedence, or bandwidth restriction. The data packet may be enqueued in a priority processing queue according to the traffic class value. In some embodiments, one or more attributes associated with the packet are included in a QoS profile, and the QoS profile is modified if the packet is determined as representing control traffic and as received from a privileged node. In still further embodiments, the packet is assigned a code if it is determined as representing control traffic, and a QoS profile is selected for the packet based upon the assigned code and the node status attribute.

According to an alternative embodiment of the present invention, a first list of QoS profiles is maintained for packets determined as received from privileged nodes and a second list of QoS profiles is maintained for packets determined as received from non-privileged nodes. In such embodiments, the assigned code may be used as an index value to select a QoS profile from the first list if the packet is determined as received from a privileged node and to select a QoS profile from the second list if the packet is determined as received from a non-privileged node.

According to an alternative embodiment of the present invention, the node status attribute of a source address is dynamically updated in the address database. In such embodiments, dynamically updating the node status attribute of a source address in the address database may be responsive to receiving one or more authentication packets In accordance with another embodiment of the present invention, a network device configured to process a data packet is disclosed. The network device includes a packet inspection module configured to receive a packet and to indicate whether the packet represents control traffic, a status determination module configured to receive the packet and to indicated whether the packet is received from a privileged node, and an attribute assignment module configured to modify one or more attributes associated with the packet if the packet is indicated as being control traffic and received from a privileged node. The network device further includes a plurality of queues configured to store the packet for further processing according to the one or more modified attributes. The packet inspection module and status determination module may be variously disposed in a router, bridge or policy engine.

In an exemplary embodiment of the network device, the packet inspection module is further configured to determine whether the packet represents control traffic based upon at least one of a network protocol, address field, destination port, or application type associated with the packet. In some embodiments, the status determination module queries an address database using a source address of the packet to determine whether the packet is received from the privileged node. The address database may include a forwarding address database.

According to an alternative embodiment of the network device, the attributes modified by the attribute assignment module include at least one of a traffic class, drop precedence, or bandwidth restriction. In another embodiment of the network device, a priority queue for storing the packet is selected according to the traffic class associated with the packet. In certain exemplary embodiments, the a QoS profile is maintained for the packet, and the QoS profile of the packet is modified if the packet is determined as representing control traffic and the packet is determined as received from the privileged node. In further embodiments, the packet inspection module assigns a code to packets that are determined as representing control traffic and the attribute assignment module is configured to select a QoS profile for packets based upon the assigned code and the node status attribute.

In specific embodiments of the network device, the attribute assignment module maintains a first list of QoS profiles for packets determined as received from privileged nodes and a second list of QoS profiles for packets determined as received from non-privileged nodes. In some embodiments, the attribute assignment module uses the assigned code as an index value to select a QoS profile for or a packet from the first list if the packet is determined as received from the privileged node and to select a QoS profile from a second list if the packet is determined as received from a non-privileged node.

In accordance with still further embodiments, the network device includes an interface coupled to a processing unit. The interface is configured to receive information for updating the node status attribute of a source address in the address database. In specific embodiments, the processing unit is configured to receive one or more authentication packets from the interface and to dynamically update the node status attribute of a source address in the address database based upon the authentication packets.

In accordance with an exemplary embodiment of the present invention, a network device for processing data packets is disclosed. The network device comprises means for receiving a packet at a network interface, means for determining whether the packet represents control traffic, and means for determining whether the packet is received from a privileged node. If the packet is determined as representing control traffic and as received from a privileged node, one or more attributes associated with the packet are modified. Means for modifying packet attributes are provided. The invention further includes means for processing the packet according to the one or more modified attributes.

Additional embodiments of the present invention determine whether the packet represents control traffic based upon at least one of a network protocol, address field, destination port, or application type associated with the packet. In certain exemplary embodiments, determining whether the packet is received from a privileged node includes means for extracting a source address from the packet, means for performing a query of the source address in an address database, and means for retrieving a node status attribute associated with the source address from the address database. In exemplary embodiments, the address database is a forwarding database.

In a specific embodiment of the present invention, the one or more attributes modified include at least one of a traffic class, drop precedence, or bandwidth restriction. Means for enqueuing the packet in a priority processing queue according to the traffic class value are provided. In further embodiments, the one or more attributes associated with the packet are included in a QoS profile, and the QoS profile is modified if the packet is determined as representing control traffic and as received from a privileged node. In still further embodiments, the packet is assigned a code if it is determined as representing control traffic, and a QoS profile is selected for the packet based upon the assigned code and the node status attribute. Means for assigning the code are included.

According to an alternative embodiment of the present invention, means for maintaining a first list of QoS profiles are provided for packets determined as received from privileged nodes and means for maintaining a second list of QoS profiles are provided for packets determined as received from non-privileged nodes. In such embodiments, the invention may include means for using the assigned code as an index value to select a QoS profile from the first list if the packet is determined as received from a privileged node and to select a QoS profile from the second list if the packet is determined as received from a non-privileged node.

Additional embodiments of the present invention include means for dynamically updating the node status attribute in the address database. In such embodiments, dynamically updating the node status attribute of a source address in the address database may be responsive to receiving one or more authentication packets.

In accordance with an exemplary embodiment of the present invention, a network device for processing data packets is disclosed. The network device includes code for receiving a packet at a network interface, code for determining whether the packet represents control traffic, and code for determining whether the packet is received from a privileged node. If the packet is determined as representing control traffic and as received from a privileged node, one or more attributes associated with the packet are modified. Code for modifying packet attributes is provided. The invention further includes code for processing the packet according to the one or more modified attributes.

Additional embodiments of the present invention determine whether the packet represents control traffic based upon at least one of a network protocol, address field, destination port, or application type associated with the packet. In certain exemplary embodiments, determining whether the packet is received from a privileged node includes code for extracting a source address from the packet, code for performing a query of the source address in an address database, and code for retrieving a node status attribute associated with the source address from the address database. In exemplary embodiments, the address database is a forwarding database.

In a specific embodiment of the present invention, the one or more attributes modified include at least one of a traffic class, drop precedence, or bandwidth restriction. Code for enqueuing the packet in a priority processing queue according to the traffic class value is provided. In further embodiments, the one or more attributes associated with the packet are included in a QoS profile, and the QoS profile is modified if the packet is determined as representing control traffic and as received from a privileged node. In still further embodiments, the packet is assigned anode if it is determined as representing control traffic, and a QoS profile is selected for the packet based upon the assigned code and the node status attribute. Code for assigning the aforementioned code is included.

According to an alternative embodiment of the present invention, code for maintaining a first list of QoS profiles is provided for packets determined as received from privileged nodes and code for maintaining a second list of QoS profiles is provided for packets determined as received from non-privileged nodes. In such embodiments, the invention may include code for using the aforementioned assigned code as an index value to select a QoS profile from the first list if the packet is determined as received from a privileged node and to select a QoS profile from the second list if the packet is determined as received from a non-privileged node.

According to an alternative embodiment of the present invention, code for dynamically updating the node status attribute in the address database is provided. In such embodiments, dynamically updating the node status attribute of a source address in the address database may be responsive to receiving one or more authentication packets

DETAILED DESCRIPTION OF THE INVENTION

A network device and method of processing packets are disclosed. The network device receives a packet at a network interface and determines whether the packet represents control traffic. The network device also determines whether the packet is received from a privileged node. To achieve this, a source address is extracted from the packet, a query of the source address is performed in an address database, and a node status attribute associated with the source address is returned from the address database. If the packet represents control traffic and is received from a privileged node, the network device modifies one or more attributes associated with the packet. These attributes may include a traffic class, drop precedence value, or bandwidth restriction. Packets that represent control traffic may be placed in a priority queue for further processing based upon their associated attributes.

Figure 1:
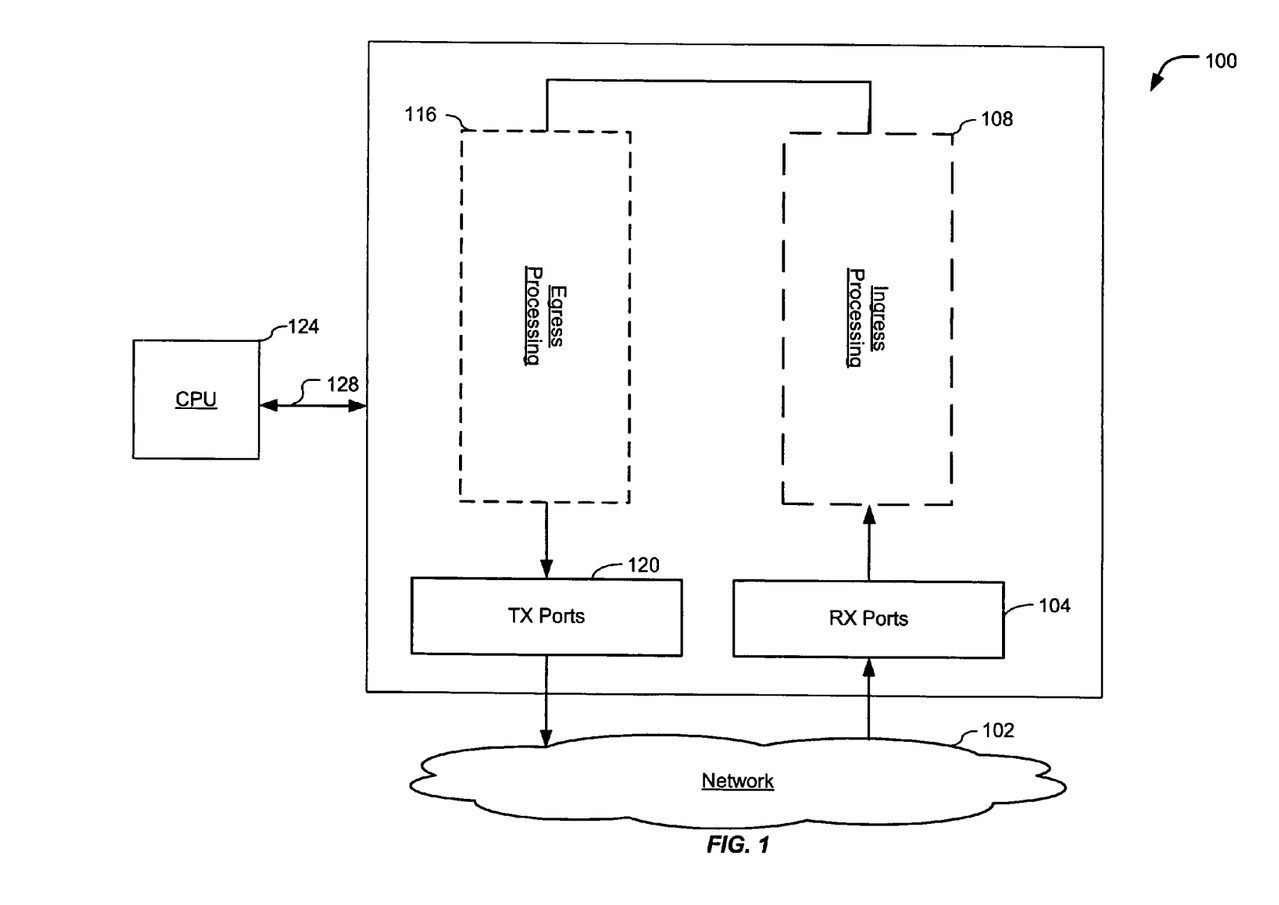
FIG. 1 is a simplified block-diagram of a network packet processor in accordance with an embodiment of the present invention.

FIG. 1 is a simplified block-diagram of a network packet processor in accordance with an embodiment of the present invention. Network packet processor 100 is shown as including, in part, a plurality of input (ingress) ports identified as RX ports 104, an ingress processing block 108, an egress processing block 116, and a plurality of output (egress) ports identified as TX ports 120. CPU 124 may also be connected to packet processor 100. Ingress processing block 108 and egress processing block 112 each include one or more stages (not shown) configured to perform various processing operations on packets. In some embodiments, among other things, ingress processing block 108 may include a bridge engine, a policy engine, a router engine, and a pre-egress engine.

Packets are received by packet processor 100 at one or more RX ports 104. RX ports 104 receive packets from devices coupled to network 102 and may check the packets for errors before they are forwarded to ingress processing block 108. For example, an RX port may determine whether packets are properly sized and may verify the integrity of their contents with a cyclic redundancy check. Packets with errors may be discarded without further processing by the packet processor.

A QoS profile may be assigned to each packet by elements of ingress processing block 108. The QoS profile represents a collection of individual attributes that specify how the packet will be processed. In some embodiments, the QoS profile includes a traffic class and a drop precedence value and may also include rate limiting information. The traffic class attribute may be used to select a priority queue for storing the packet for additional processing by CPU 124. The drop precedence value provides a means of prioritizing among packets with a same traffic class. If, for example, insufficient queuing resources are available to store packets with a same traffic class, packet processor 100 may discard packets with low drop precedence values before discarding packets with high drop precedence values. Rate limits may be used to control how many packets are processed per unit of time based upon information about the packets. Some exemplary embodiments of the packet processor support 8 traffic classes, 3 drop precedence values, and 255 rate settings.

CPU 124 may communicate with packet processor 100 over data and control bus 128. In some embodiments, CPU 124 is configured to perform additional processing of data packets and may run user-configurable software for this purpose. Packet processor 100 may place packets into priority queues for transfer to CPU 124. CPU 124 may access the priority queues via data and control bus 128. Some embodiments of the packet processor support communication with CPU 124 via a standard PCI bus. Other embodiments may include a PCI-Express bus. Still further embodiments may communicate with CPU 124 using an MII interface. When CPU 124 has finished processing, it may return packets to the packet processor.

Figure 2:
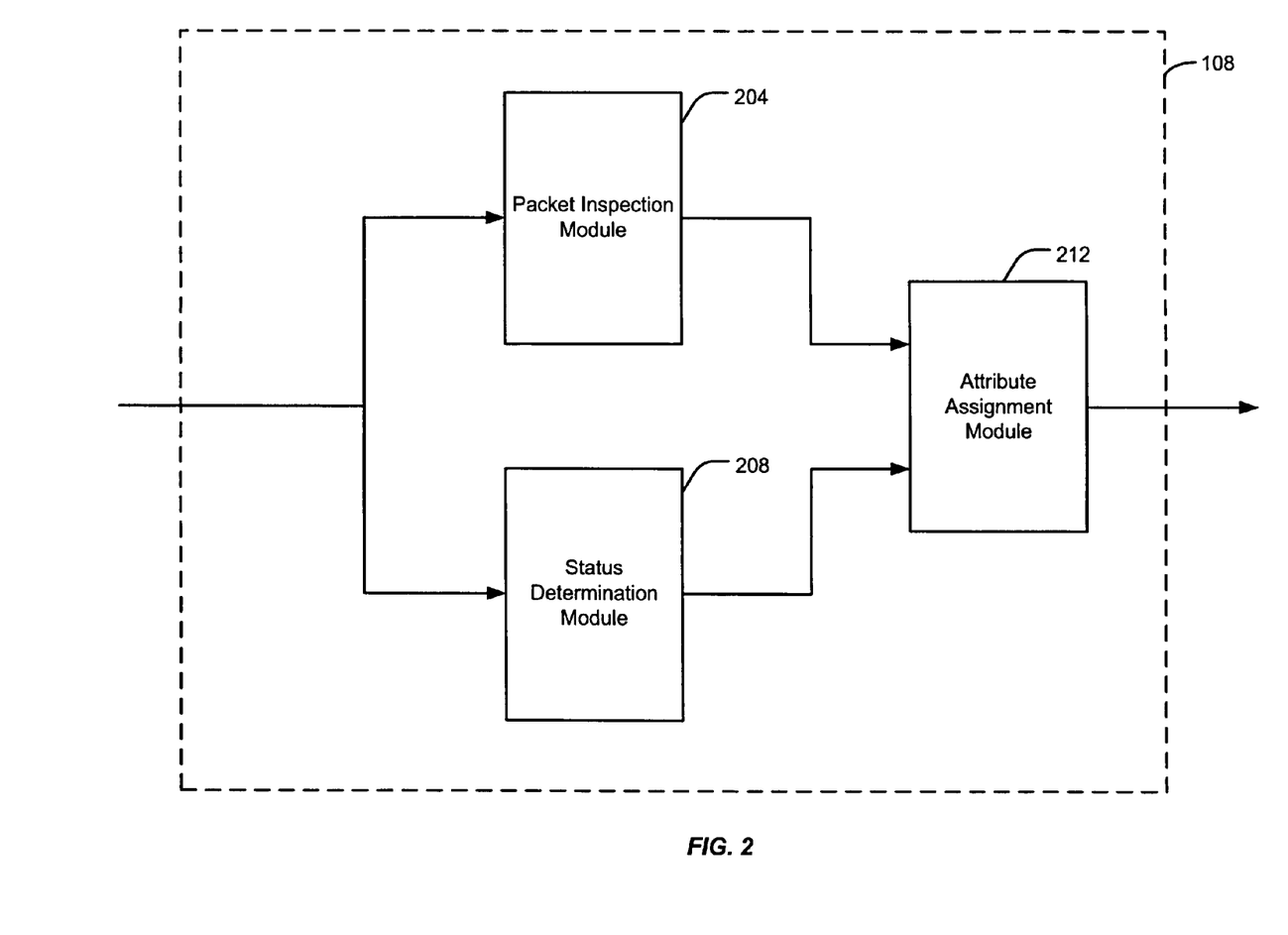
FIG. 2 is a simplified block-diagram showing various ingress processing operations in accordance with an embodiment of the present invention.

FIG. 2 shows processing operations performed by ingress processing block 108 according to one embodiment of the present invention. As shown, ingress processing block 108 includes three processing modules arranged such that a data packet is provided to the input of a packet inspection module 204 and a status determination module 208. Outputs from packet inspection module 204 and status determination module 208 are received as inputs to an attribute assignment module 212.

Packet inspection module 204 is configured to detect packets that require further processing by CPU 124. In some embodiments, packet inspection module 204 is disposed in a bridge, router, or policy engine that may be collectively included as part of an ingress processing pipeline. In such cases, information about data packets is gathered by the various ingress processing stages and available to packet inspection module 204. This information may include an application type, source and destination address, network protocol, and destination port. Packet inspection module 204 examines the packet information and determines whether the data packet requires additional processing.

In some embodiments, packet processor 100 may be configured to perform additional processing of packets having predetermined Layer 2 or Layer 3 network addresses. If packet inspection module 204 detects that a packet is addressed to one of these predetermined addresses, it may indicate that the packet represents control traffic and mark the packet for further processing by CPU 124. Similarly, if the packet is detected as having a well-known control protocol, it may be marked for additional processing. A partial list of well-known control packets that may be marked for additional processing by packet inspection module 204 for additional processing includes:
  BPDUs
  IEEE Reserved Multicast
  Cisco Layer 2 Control Multicast
  IGMP
  IPv6 ICMP, including MLD
  UDP Broadcast
  ARP Request and Reply
  IPv6 Neighbor Solicitation
  IPv4/6 Control Protocols over Link-Local Multicast
  RIPv1

The partial list of control traffic packets is offered for purposes of illustration only. It is understood that other packets, including packets addressed to a management interface of the packet processor, may also be treated as control traffic and may be marked for further processing. It is further understood that packet inspection module 204 may signify that a packet is a control traffic packet based upon information in a user-defined database. For example, packet inspection module 204 may function as part of a policy engine and mark packets for further processing based upon one or more user-defined criteria.

Before a control traffic packet (also referred to as "control packet") is scheduled for additional processing, status determination module 208 determines whether the packet was received from a privileged node or a non-privileged node. Packet processor 100 assigns a privilege level to each network address and processes packets received from the network addresses according to their privilege level. In some embodiments, privilege level is determined based upon a node status attribute. This determination may involve several processing operations.

In a first operation, addressing information may be extracted from the packet header. A generic data packet, for example, may include an Ethernet header, an IP header, and payload. Status determination module 208 may utilize addressing information from one or more of the packet headers to make a determination as to whether the packet was received from a privileged node. For example, if status determination module 208 is disposed in an Ethernet bridge, it may operate upon a source MAC address of the data packet. If, on the other hand, status determination module 208 is disposed in an IP router, it may operate upon the source IP address of the data packet. When the status determination module forms part of a policy engine, it may operate upon a combination of addressing information.

In a next step, status determination module 208 may query an address database to obtain additional information about the packet. The type of address database may depend upon the context in which status determination module 208 operates. For example, a status determination module operating as part of a bridge might query a forwarding address database to obtain further details about the source and/or destination address of the data packet. If the status determination module 208 is included as part of a router, it may query a prefix database. Finally, a status determination module 208 included as part of a policy engine may query a user-configurable database.

In an exemplary embodiment, two sets of information about each network address are stored in the address database. A first set of information in the address database may be used to process packets sent from the network address and a second set of information may be used to process packets sent to the network address. Thus, in some cases, the status determination module 208 performs two queries in the address database for each data packet that is processed. In a first operation, status determination module 208 may query the address database for information about the destination address of the packet. For example, in a router, status determination module 208 may obtain routing information for a destination IP address. In a second operation, status determination module 208 may query the address database for information about the source address of the packet. Source address information includes a node status attribute that defines whether the source address is an address of a privileged node or a non-privileged node. Default information, including a default node status attribute, may be assigned to a packet if an entry matching the source address is not found in the address database.

Figure 3:
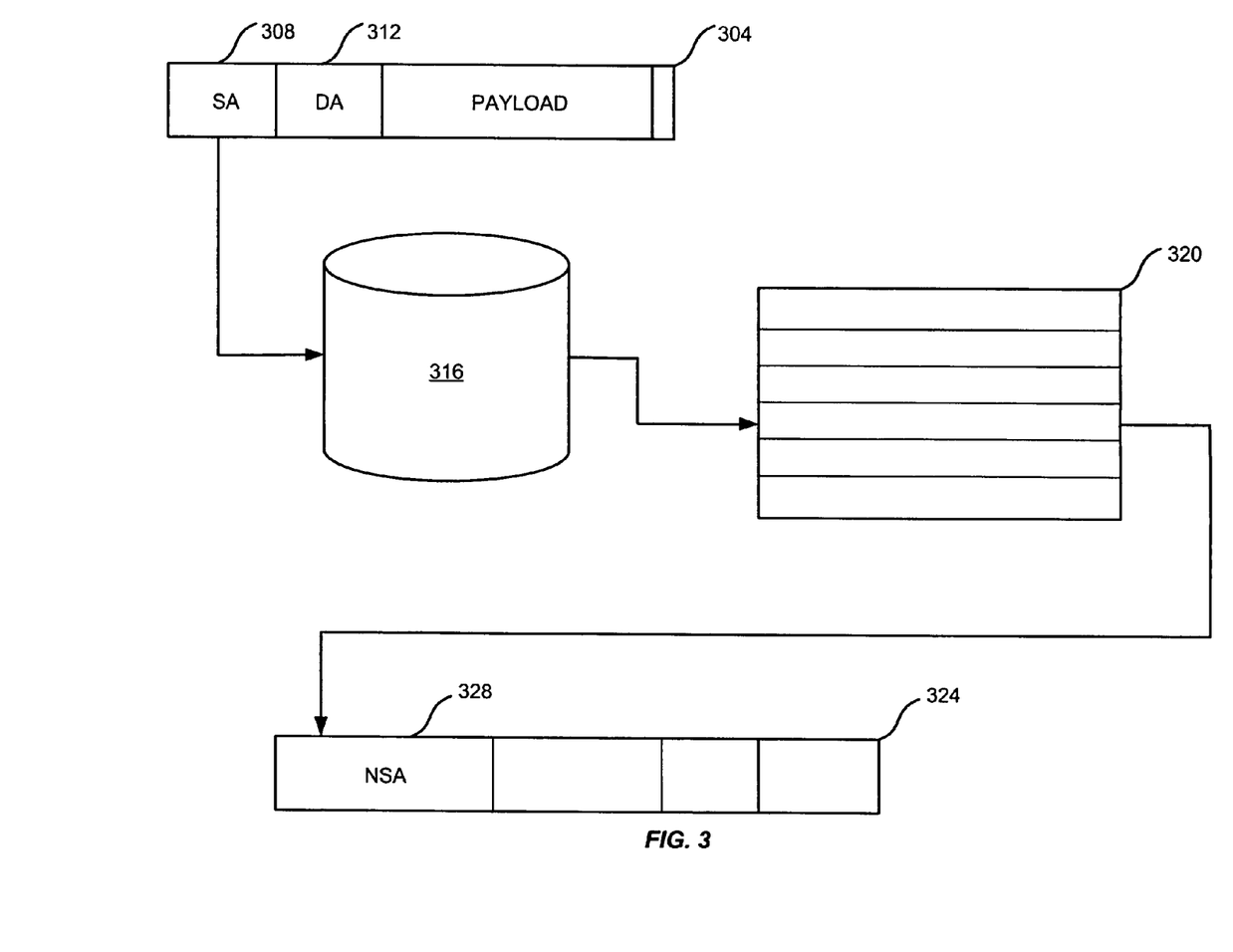
FIG. 3 shows various blocks associated with node status attribute retrieval in accordance with one embodiment of the present invention.

FIG. 3 shows the operation of status determination module 208 in the context of an IP router. Data packet 304 is shown as containing information in several fields. These fields include a source address 208, a destination address 212, and payload. Status determination module 208 extracts a source address from the source address field 208 disposed in the packet header.

After the source address of data packet 304 has been identified, it may be used to query a prefix database 316. If a match is found, prefix database 316 may return a pointer to an entry in a next-hop table 320 that corresponds to source address 308 of packet 304. Packet processor 100 may use the pointer to next-hop table 320 to obtain information about the source address 308 of packet 304. Source address information 324, in turn, may include the node status attribute (NSA) 328.

By way of further illustration, in some embodiments a header decode engine may extract source address 308 from packet 304. Status determination module 208 functioning as part of routing engine may perform an initial lookup of the source address in prefix database 316. If a match is found, a pointer to a corresponding entry in next-hop table 320 may be returned and used by the routing engine to obtain node status attribute 328 for the source address. On the other hand, if no match is found, prefix database 316 may return a pointer to a default entry in next-hop table 320. The default entry, in turn, may include a default node status attribute for the packet. In some embodiments, default information may be separated from the address database and assigned to a packet in the event that a matching entry is not found in the address database. In a typical implementation, the default node status attribute will indicate a non-privileged node.

Referring to FIG. 2, packet inspection module 204 and status determination module 208 provide information about the packet to attribute assignment module 212. In some embodiments, attribute assignment module 212 is disposed to receive packets after ingress processing is complete. Packet processor 100 may schedule control traffic packets for additional processing by CPU 124. The manner in which control traffic packets will be processed is determined by one or more attributes. Attribute assignment module 212 sets appropriate quality of service attributes for a packet based upon the node status attribute and the type of the packet. These quality of service attributes enable packet processor 100 to support different levels of service for different types of traffic generated by different network addresses.

Attributes assigned or modified by attribute assignment module 212 may include one or more of the traffic class, drop precedence value, or rate limit associated with a control traffic packet. In some embodiments, attribute assignment module 212 assigns these attributes by changing the QoS profile associated with the packet. These attributes may affect subsequent processing of the packet. In some embodiments, these attributes affect how packets are presented to a CPU for further processing. The traffic class of a packet, for example, may correspond to a priority queue at the CPU port. By changing the traffic class, attribute assignment module 212 effectively re-prioritizes the packet in relation to the processing of other packets. In this way, packet processor 100 can provide a higher level of service to control packets received from privileged nodes.

By way of illustration, a system administrator may designate a management terminal as a privileged node. This may be done by modifying the node status attribute of the entry in the address database that corresponds to the address of the management terminal. After the management terminal has been designated as a privileged node, the packet processor may be configured to increase the quality of service provided to control packets received from the management terminal. In some instances, control packets received from the privileged-node management terminal may be enqueued in a higher priority queue than control packets received from non-privileged nodes.

In addition to traffic class, attribute assignment module 212 may assign a drop precedence value to control packets based upon source address privilege. Drop precedence values may be used to make resource allocation decisions during periods of network congestion. For example, the packet processor may receive more control traffic packets than the attached CPU can process at a particular time. If sufficient queuing resources are not available to store the packets, the packet processor may respond by selectively dropping packets. The decision to drop a particular packet may be determined, in part, by the packet's drop precedence value. By assigning a higher drop precedence value, the packet processor can give preferential treatment to packets received from privileged nodes thereby increasing the likelihood that they will be processed by the CPU. Thus, a particular type of packet may be dropped when received from a non-privileged node while the same type of packet received from a privileged node may not be dropped.

Attribute assignment module 212 may also modify a rate limit value associated with control packets. The rate limit may determine a maximum rate at which the CPU will process certain types of packets. The CPU may regulate the bandwidth available to control packets received from certain addresses or to packets which represent specific types of control traffic. Packets that exceed an applicable rate limit may be marked as non-conforming and, in some circumstances, may be dropped. By changing the rate limit associated with control packets received from privileged nodes, the pre-egress engine can increase the number of privileged node packets that may be processed per unit of time relative to packets received from non-privileged nodes.

The node status attribute also enhances security and contributes to maintaining availability of service on the network. Control traffic is important to the proper functioning of the network. However, control traffic packets may also represent a threat to network security. For example, a malicious user may attempt to implement a denial of service attack by flooding a packet processor with control packets. If the packet processor is not able to distinguish between the malicious control packets and legitimate control packets, it may be difficult for a system administrator to gain control over the device. Consequently, the packet processor may be temporarily overwhelmed and service may be interrupted. This is particularly true if the packet processor has limited queuing resources and/or a limited ability to process control packets.

The node status attribute enables the packet processor to discriminate among control packets. Thus, for example, control packets received from a system administrator using a privileged node may be assigned a traffic class representing a higher processing priority than non-privileged control packets. This means that even if a non-privileged user sends large numbers of control traffic packets to the packet processor, packets from a system administrator would still be processed and countermeasures could be employed. In addition, the packet processor may rate limit non-privileged control traffic packets. In this way, the number and effect of malicious packets on the network can be minimized. Finally, even under normal conditions, the node status attribute ensures that control packets from privileged nodes receive a higher level of service than control packets from non-privileged nodes. Thus, routine maintenance operations may be performed even during periods of peak loading without disrupting other traffic on the network.

When ingress processing is complete, the packet may be enqueued at the CPU port according to its attributes or QoS profile. Thereafter, the packet may be returned to the packet processor and may be placed into the egress pipeline.

Figure 4:
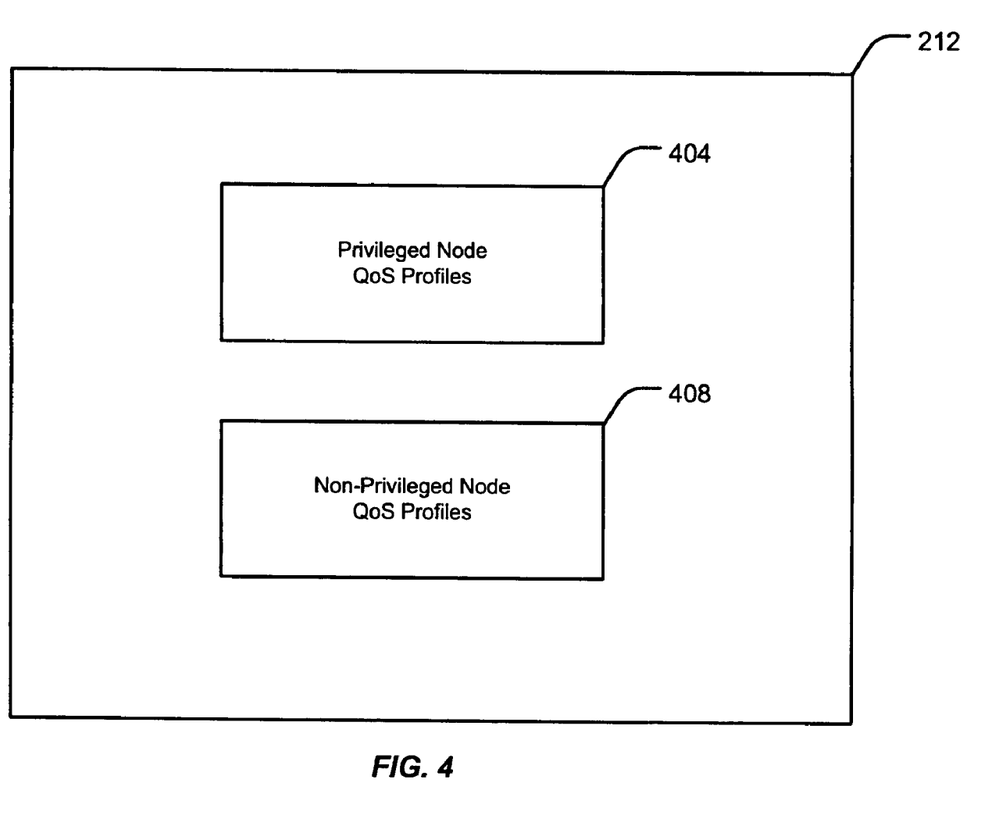
FIG. 4 shows elements of an attribute assignment module in accordance with an embodiment of the present invention.

FIG. 4 is a simplified block-diagram of an attribute assignment module 212 in accordance with a further embodiment of the present invention. In this embodiment, the packet assignment module assigns an exception code to packets that are marked for processing by CPU 124. The exception code may communicate information about the packet, including an indication of the reason that further processing is required. For example, if a packet was marked for further processing based upon its network protocol, the packet inspection module may assign an exception code to the packet corresponding to that particular network protocol. By way of illustration, TCP SYN packets may be assigned a same exception code if they are marked for further processing.

Attribute assignment module 212 may use the exception code and node status attribute to select a QoS profile for a packet. A first table of QoS profiles 404 may be maintained for assignment to packets received from privileged nodes, and a second table of QoS profiles 408 may be maintained for packets received from non-privileged nodes. In some embodiments, attribute assignment module 212 first selects a table of QoS profiles 404, 408 using the node status attribute and then retrieves a QoS profile from the table using the exception code as an index value. The selected QoS profile is then assigned to the packet.

Figure 5:
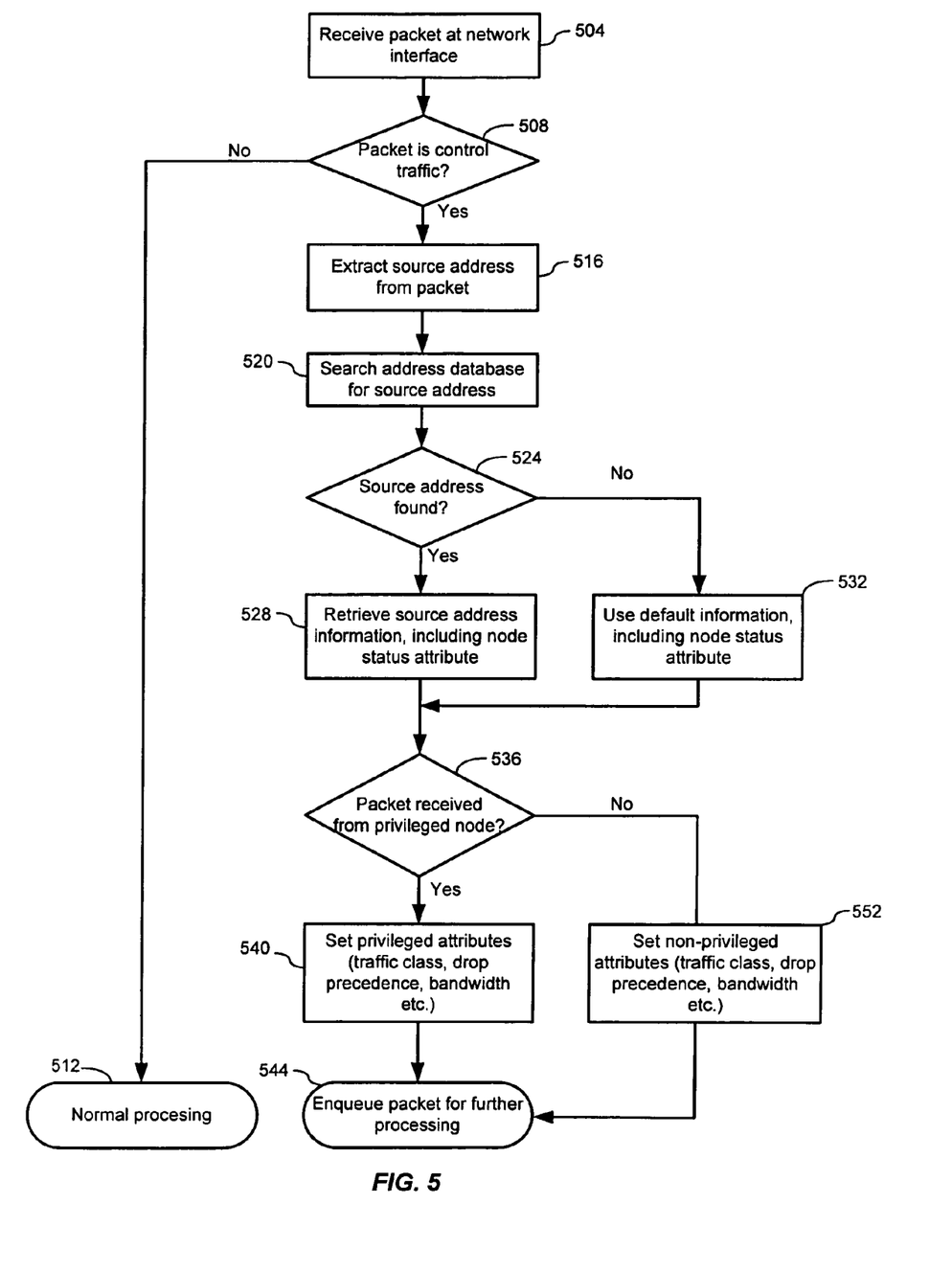
FIG. 5 is a flow-chart of steps performed by a network packet processor in accordance with an embodiment of the present invention.

Referring next to FIG. 5, a flow-diagram of various steps performed by a packet processor in accordance with an embodiment of the present invention is shown. In a first step 504, a packet is received at the network interface. The packet processor checks whether the packet represents control traffic 508. In some embodiments, this determination is made by comparing the packet's network protocol to a list of control traffic protocols. If the packet does not represent control traffic, it may be processed normally 512. However, if the packet does represent control traffic, additional processing steps are performed.

In a next step 516, a source address is extracted from the packet. This address, for example, may be an IP address corresponding to a unique device on an IP network or an address associated with other network protocols. A header decode engine may be used to extract address information from the packet. The packet processor performs a lookup 520 of the source address in an address database. In some embodiments, the address database includes a forwarding database. In still other embodiments, the address database may include a prefix database and a next-hop table. If an entry corresponding to the source address is found in the address database 524, the packet processor retrieves information about the source address 528, including the node status attribute. Otherwise, the packet processor may use default information 532 obtained from the address database or stored separately.

In a next step 536, the packet processor uses the node status attribute to determine whether the packet was received from a privileged node. If the packet was received from a privileged node, the packet processor assigns a first set of attributes 540 to the packet. These attributes may affect the level of service provided to the packet and may be related to exception processing of the packet. Traffic class, drop precedence, or bandwidth restriction attributes may be assigned or modified at this step. If the packet was received from a non-privileged node, a second set of attributes 542 may be assigned to the packet. These attributes may reflect a lower processing priority than the first set of attributes. For example, non-privileged packets may be assigned a lower-priority traffic class, a higher drop precedence value, or a reduced rate limit compared to packets received from privileged nodes. Finally, the packet is enqueued for further processing 544. In some cases, a CPU may perform exception processing of the enqueued packet.

A packet processor in accordance with the present invention may dynamically update the node status attribute associated with a source address in response to receiving an authentication request. For example, a system administrator may wish to add a remote workstation to the network for temporary use in performing administrative tasks. When the workstation is initially connected, the address database in the packet processor may or may not contain an entry for the remote workstation. If the address database does not contain an entry for the remote workstation, a default entry indicating a non-privileged node may be used to process packets received from the remote workstation. Alternatively, there may be an entry in the address database that indicates the workstation is a non-privileged node.

A system administrator may determine that it is appropriate to set the node status attribute for the remote workstation. For example, the system administrator may require a service which is blocked for non-privileged workstations, or may wish to administer packet processing from the workstation while the network is under attack. By way of illustration, this may involve reducing the latency associated with a particular type of packet (e.g., HTTP) or removing bandwidth restrictions that might otherwise apply to certain types of traffic (e.g., FTP). The node status attribute provides a means for the administrator to change the quality of service attributes associated with packets received by the packet processor from the address of the remote workstation.

Figure 6:
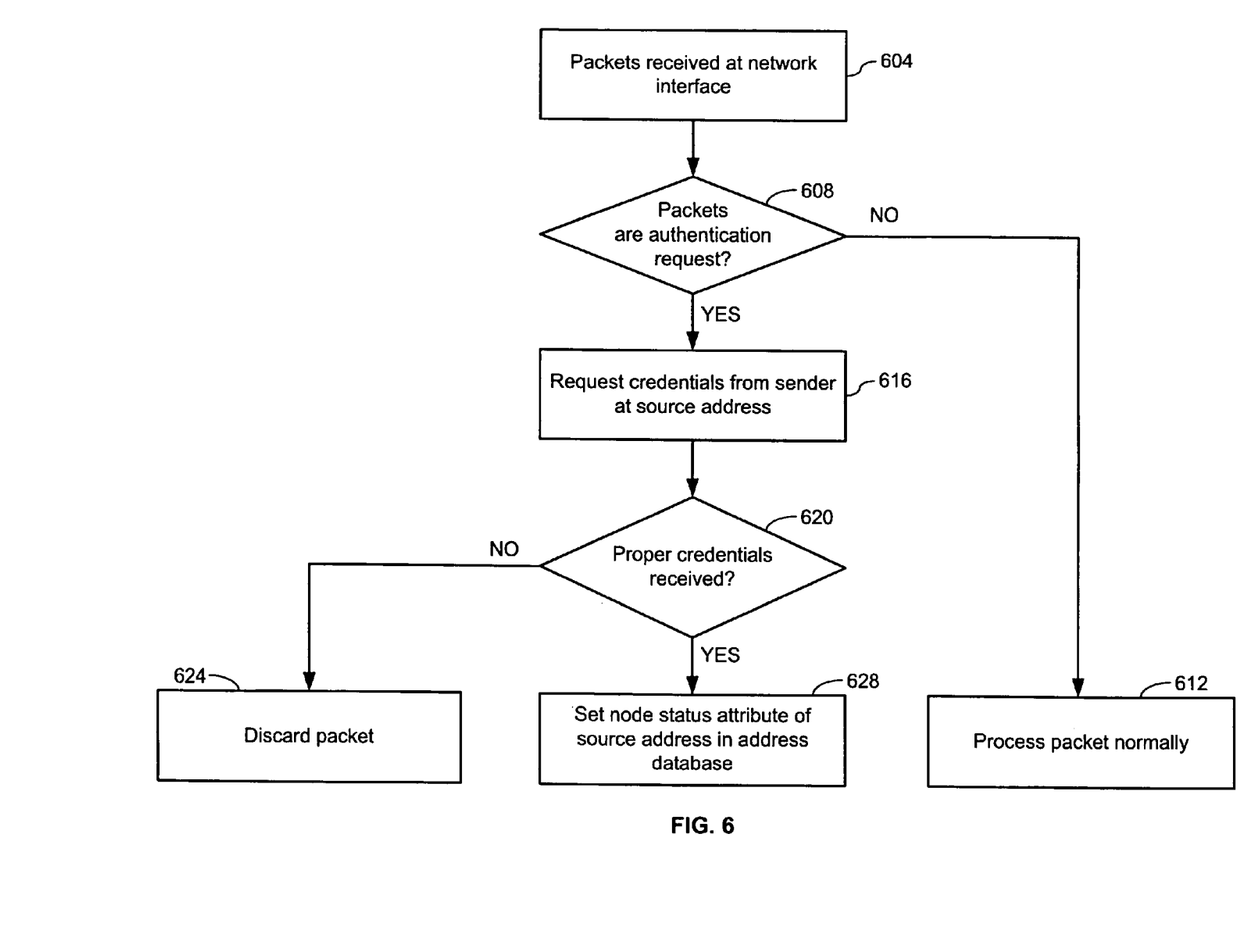
FIG. 6 is a flow-diagram of an authentication process by which the node status attribute may be changed according to an embodiment of the present invention.

Referring to FIG. 6, a flow-diagram shows the authentication process by which the node status attribute associated with a source address may be changed. In a first step 604, packets are received at a network interface. The packet processor examines the packets and determines whether they represent a request for authentication 608. For example, the packets may represent traffic from the system administrator who is attempting to establish privileged node status for the remote workstation. If the packets do not represent a request for authentication, they are processed normally 612.

The packet processor may request credentials from the sender of the packets 616 upon receiving packets that represent a request for authentication. In the previous example, an authentication application may challenge the system administrator to furnish a user name and password before processing the request. The authentication application may then take one of two actions 620 in response to the authentication request. If proper credentials are not received from the requestor, subsequent request packets may be discarded 624. Otherwise, the authentication application may update the source address information in the address database of the packet processor to change the node status attribute associated with the requestor's address 628. After the node status attribute has been changed, the requestor's address may be recognized as a privileged node and given a higher level of service as previously discussed.

Some embodiments of the present invention may provide a management interface for requesting privileged node status. For example, a system administrator may direct packets to a network address and port monitored by a server program running on the packet processor. The server program may implement common network protocols such as HTTP or TELNET or it may implement a customized protocol. In addition, the server program may provide a secure means of communicating with devices over the network. For example, the server program may use one or more encryption algorithms to encode and decode packets representing requests for authentication. In this way, the authentication application may recognize authorized users and securely grant or remove privileged node status through the exchange of secure packets.

The above description of exemplary embodiments of the invention has been presented for the purposes of illustration and description. It is not intended to be exhaustive or to limit the scope of the invention, which is set forth in the following claims, to the precise form or forms described. Many modifications and variations are possible in light of the teaching above. The exemplary embodiments were chosen to explain the principles of the invention with its practical applications and to thereby enable others skilled in the art to make and use the invention in various other embodiments and with various modifications.

What is claimed is:

1. A method of processing packets in a network, the method comprising:
    assigning, at a network device, a processing priority indicator with each of selected network nodes among a plurality of network nodes, wherein each processing priority indicator indicates a processing priority for packets whose source is the respective network node;
    receiving a packet at the network device, the packet having a source address and a destination address;
    determining whether the packet represents control traffic;
    querying an address database using the source address of the packet and determining a processing priority indicator associated with a source network node which is the source of the packet;
    determining whether the packet is received from a privileged node based on the processing priority indicator associated with the source network node;
    modifying one or more attributes associated with the packet if the packet is determined as representing control traffic and as being received from the privileged node; and
    processing the packet in accordance with the one or more modified attributes,
    wherein the packet, sourced from the network node with the processing priority indicator higher than a processing priority indicator of a second network node, is processed using a processing priority that is higher than a processing priority for packets sourced from the second network node, the packet being enqueued for further processing prior to transmission to the destination address.

2. The method of claim 1 wherein the packet is determined as representing control traffic based upon at least one of a network protocol, an address field, a destination port, or an application type associated with the packet.

3. The method of claim 2 wherein determining whether the packet is received from the privileged node further comprises:
    extracting the source address from the packet; and
    retrieving a node status attribute associated with the source address from the address database.

4. The method of claim 3 wherein the address database comprises a forwarding database.

5. The method of claim 3 wherein the one or more modified attributes include at least one of a traffic class, a drop precedence, or a bandwidth restriction.

6. The method of claim 5 wherein the packet is enqueued in a priority processing queue according to a traffic class value of the packet.

7. The method of claim 3 wherein the one or more modified attributes associated with the packet are included in a QoS profile, and wherein the QoS profile is modified if the packet is determined as representing control traffic and as being received from the privileged node.

8. The method of claim 7 wherein the packet is assigned a code if the packet is determined as representing control traffic, and wherein the QoS profile is selected for the packet based upon the assigned code and the node status attribute.

9. The method of claim 8 wherein a first list of QoS profiles is maintained for packets received from privileged nodes and a second list of QoS profiles is maintained for packets received from non-privileged nodes.

10. The method of claim 9 wherein the assigned code is used as an index value to select the QoS profile from the first list if the packet is determined as received from the privileged node and to select the QoS profile from the second list if the packet is determined as received from a non-privileged node.

11. The method of claim 3 further comprising dynamically updating the node status attribute of the source address in the address database.

12. The method of claim 11 wherein dynamically updating the node status attribute of the source address in the address database is responsive to receiving one or more authentication packets.

13. A network device configured to process a data packet, the network device comprising:
- a packet processor that assigns a processing priority indicator with each of selected network nodes among a plurality of network nodes, wherein each processing priority indicator indicates a processing priority for packets whose source is the respective network node, wherein the packet processor comprises:
- a packet inspection module configured to receive a packet and to indicate whether the packet represents control traffic, the packet having a source address and a destination address;
- a status determination module configured to receive the packet, to query an address database using the source address of the packet, to determine a processing priority indicator associated with a source network node which is a source of the packet, and to indicate whether the packet is received from a privileged node based on the processing priority indicator associated with the source network node;
- an attribute assignment module configured to modify one or more attributes associated with the packet if the packet is indicated as being control traffic and received from a privileged node; and
- a plurality of priority queues configured to store the packet for further processing according to the one or more modified attributes,
- wherein the packet, sourced from the network node with the processing priority indicator higher than a processing priority indicator of a second network node, is processed using a processing priority that is higher than a processing priority for packets sourced from the second network node, the packet being enqueued for further processing prior to transmission to the destination address.

14. The network device of claim 13 wherein the packet inspection module is disposed in a router.

15. The network device of claim 13 wherein the packet inspection module is disposed in a bridge.

16. The network device of claim 13 wherein the packet inspection module is disposed in a policy engine.

17. The network device of claim 13 wherein the status determination module is disposed in a router.

18. The network device of claim 13 wherein the status determination module is disposed in a bridge.

19. The network device of claim 13 wherein the status determination module is disposed in a policy engine.

20. The network device of claim 13 wherein the packet inspection module and the status determination module are disposed as part of a same processing block.

21. The network device of claim 13 wherein the packet inspection module is further configured to determine whether the packet represents control traffic based upon at least one of a network protocol, an address field, a destination port, or an application type associated with the packet.

22. The network device of claim 21 wherein the status determination module queries the address database using the source address of the packet to determine whether the packet is received from the privileged node.

23. The network device of claim 22 wherein the address database comprises a forwarding database.

24. The network device of claim 22 wherein the one or more modified attributes modified by the attribute assignment module include at least one of a traffic class, a drop precedence, or a bandwidth restriction.

25. The network device of claim 24 wherein a priority queue for storing the packet is selected according to the traffic class associated with the packet.

26. The network device of claim 22 wherein a QoS profile is maintained for the packet, and wherein the attribute assignment module modifies the packet's QoS profile if the packet represents control traffic and the packet is received from the privileged node.

27. The network device of claim 26 wherein the packet inspection module is further configured to assign a code to packets that represent control traffic, and the attribute assignment module selects a QoS profile for packets based upon the assigned code.

28. The network device of claim 27 wherein the attribute assignment module maintains a first list of QoS profiles for assignment to packets received from privileged nodes and a second list of QoS profiles for assignment to packets received from non-privileged nodes.

29. The network device of claim 28 wherein the attribute assignment module uses an assigned code as an index value to select the QoS profile for the packet from the first list if the packet is received from the privileged node and to select the QoS profile from the second list if the packet is received from a non-privileged node.

30. The network device of claim 22 further comprising an interface coupled to a processing unit, wherein the interface is configured to receive information updating the node status attribute of the source address in the address database.

31. The network device of claim 30 wherein the processing unit is configured to receive one or more authentication packets from the interface and to dynamically update the node status attribute of the source address in the address database based upon the one or more authentication packets.

32. A network device configured to process data packets, the network device comprising:
- means for assigning a processing priority indicator with each of selected network nodes among a plurality of network nodes, wherein each processing priority indicator indicates a processing priority for packets whose source is the respective network node;
- means for receiving a packet at the network device, the packet having a source address and a destination address;
- means for determining whether the packet represents control traffic;
- means for querying an address database using the source address of the packet and determining a processing priority indicator associated with a source network node which is the source of the packet;
- means for determining whether the packet is received from a privileged node based on the processing priority indicator associated with the source network node;
- means for modifying one or more attributes associated with the packet if the packet is determined as representing control traffic and as being received from the privileged node; and
- means for processing the packet in accordance with the one or more modified attributes,
- wherein the packet, sourced from the network node with the processing priority indicator higher than a processing priority indicator of a second network node, is processed using a processing priority that is higher than a processing priority for packets sourced from the second network node, the packet being enqueued for further processing prior to transmission to the destination address.

33. The network device of claim 32 wherein the packet is determined as representing control traffic based upon at least one of a network protocol, an address field, a destination port, or an application type associated with the packet.

34. The network device of claim 33 wherein determining whether the packet is received from the privileged node further comprises:
- means for extracting the source address from the packet; and
- means for retrieving a node status attribute associated with the source address from the address database.

35. The network device of claim 34 wherein the address database comprises a forwarding database.

36. The network device of claim 34 wherein the one or more modified attributes modified include at least one of a traffic class, a drop precedence, or a bandwidth restriction.

37. The network device of claim 36 further comprising means for enqueuing the packet in a priority processing queue according to a traffic class value of the packet.

38. The network device of claim 34 wherein the one or more modified attributes associated with the packet are included in a QoS profile, and wherein the QoS profile is modified if the packet is determined as representing control traffic and as being received from the privileged node.

39. The network device of claim 38 wherein the packet is assigned a code if the packet is determined as representing control traffic, and wherein the QoS profile is selected for the packet based upon the assigned code and the node status attribute.

40. The network device of claim 39 wherein a first list of QoS profiles is maintained for packets received from privileged nodes and a second list of QoS profiles is maintained for packets received from non-privileged nodes.

41. The network device of claim 40 wherein the assigned code is used as an index value to select the QoS profile from the first list if the packet is determined as received from the privileged node and to select the QoS profile from the second list if the packet is determined as received from a non-privileged node.

42. The network device of claim 34 further comprising means for dynamically updating the node status attribute of the source address in the address database.

43. The network device of claim 42 wherein dynamically updating the node status attribute of the source address in the address database is responsive to receiving one or more authentication packets.

44. The method of claim 1 wherein the processing priority indicator comprises a privilege level associated with the network node.

45. The device of claim 13 wherein the processing priority indicator comprises a privilege level associated with the network node.

46. The device of claim 32 wherein the processing priority indicator comprises a privilege level associated with the network node.

47. The method of claim 44 wherein the privilege level is assigned to a network address of the network node.

48. The method of claim 45 wherein the privilege level is assigned to a network address of the network node.

49. The method of claim 46 wherein the privilege level is assigned to a network address of the network node.

* * * * *